United States Patent
Schmalz

(10) Patent No.: US 6,813,131 B2
(45) Date of Patent: Nov. 2, 2004

(54) CIRCUIT BREAKER, TRIP ASSEMBLY, BIMETAL COMPENSATION CIRCUIT AND METHOD INCLUDING COMPENSATION FOR BIMETAL TEMPERATURE COEFFICIENT

(75) Inventor: Steven Christopher Schmalz, Greenfield, WI (US)

(73) Assignee: Eaton Corporation, Cleveland, OH (US)

( * ) Notice: Subject to any disclaimer, the term of this patent is extended or adjusted under 35 U.S.C. 154(b) by 509 days.

(21) Appl. No.: 09/940,176

(22) Filed: Aug. 27, 2001

(65) Prior Publication Data

US 2003/0043522 A1 Mar. 6, 2003

(51) Int. Cl.[7] .................................................. H02H 5/04
(52) U.S. Cl. ........................................ 361/105; 361/106
(58) Field of Search ............................. 361/105, 42, 94, 361/103, 106

(56) References Cited

U.S. PATENT DOCUMENTS

| | | | |
|---|---|---|---|
| 3,593,249 A | * 7/1971 | Sedgwick | .................... 337/113 |
| 5,070,932 A | * 12/1991 | Vlasak | ........................ 165/240 |
| 5,224,006 A | 6/1993 | MacKenzie et al. | |
| 5,691,869 A | 11/1997 | Engel et al. | |
| 5,818,237 A | 10/1998 | Zuercher et al. | |
| 6,639,768 B2 | * 10/2003 | Zuercher et al. | .............. 361/42 |

OTHER PUBLICATIONS

American Institute of Physics Handbook, 1983, 2nd edition, pp. 9–38–9–40.*
Alpha Sensors, Inc. "*Thermal Measurement Solutions—Application Notes*", www.alphasensors.com/appnotes.html, Jun. 28, 2001, 5 pp.
"*NTC Thermistors*", Thermometrics, Inc., Edison, NJ 08817–4695, 28 pp.
PANASONIC, "*Multilayer Chip NTC Thermistors*", NTC Thermistors (Chip Type), 8 pp.

* cited by examiner

Primary Examiner—Brian Sircus
Assistant Examiner—Z Kitov
(74) Attorney, Agent, or Firm—Marvin L. Union

(57) ABSTRACT

A circuit breaker includes separable contacts, a latchable operating mechanism having a latch member, a bimetal and an arc fault trip assembly. The trip assembly includes a thermistor responsive to bimetal temperature, an amplifier having first and second inputs and an output, a first resistor electrically connected between a second bimetal terminal and the first amplifier input, a second resistor electrically connected in parallel with the thermistor, a third resistor electrically connected in series with that parallel combination, with that series combination being electrically connected between the first amplifier input and the amplifier output. The second amplifier input is referenced to the first bimetal terminal. The amplifier output has a voltage, which is compensated for the bimetal temperature coefficient. The trip assembly provides a trip signal as a function of compensated voltage. A solenoid responds to the trip signal and releases the latch member to trip the separable contacts open.

20 Claims, 13 Drawing Sheets

CIRCUIT BREAKER, TRIP ASSEMBLY, BIMETAL COMPENSATION CIRCUIT AND METHOD INCLUDING COMPENSATION FOR BIMETAL TEMPERATURE COEFFICIENT

CROSS-REFERENCE TO RELATED APPLICATION

This application is related to commonly assigned U.S. patent application Ser. No. 09/845,519, filed Apr. 30, 2001, entitled "Circuit Breaker" (Attorney Docket No. 00-mAE2-326).

BACKGROUND OF THE INVENTION

1. Field of the Invention

This invention relates to electrical switching apparatus and, more particularly, to circuit breakers, such as, for example, arc fault circuit breakers. The invention also relates to a method of operating a circuit breaker. The invention further relates to a trip assembly for a circuit breaker. The invention also relates to a bimetal compensation circuit for a circuit breaker.

2. Background Information

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

Subminiature circuit breakers are used, for example, in aircraft electrical systems where they not only provide overcurrent protection but also serve as switches for turning equipment on and off. A circuit breaker push-pull handle is moved from in-to-out in order to open the load circuit. This action may be either manual or, else, automatic in the event of an overload or fault condition. If the push-pull handle is moved from out-to-in, then the load circuit is re-energized. If the load circuit had been automatically de-energized, then the out-to-in operation of the push-pull handle corresponds to a circuit breaker reset action.

Typically, subminiature circuit breakers have only provided protection against persistent overcurrents implemented by a latch triggered by a bimetal responsive to $I^2R$ heating resulting from the overcurrent. There is a growing interest in providing additional protection, and most importantly arc fault protection. Arc faults are typically high impedance faults and can be intermittent. Nevertheless, such arc faults can result in a fire. During sporadic arcing fault conditions, the overload capability of the circuit breaker will not function since the root-mean-squared (RMS) value of the fault current is too small to activate the automatic trip circuit. An electronic arc fault sensing circuit directly trips and, thus, opens the circuit breaker.

Although many circuit breakers also employ ground fault protection, in aircraft applications, the aircraft frame is ground, and there is no neutral conductor. Some aircraft systems have also provided ground fault protection, but through the use of additional devices, namely current transformers which in some cases are remotely located from the protective relay.

In many circuit breaker applications, the voltage across the thermal bimetal element is employed as an indirect measurement of the circuit breaker load current. Sensing current with a bimetal element, as is common practice in circuit breaker based electronics, is complicated by the variation of that element's impedance as a function of temperature. This variation results in inaccuracies in the measurement of the amplitude of the measured current. For example, the bimetal element's impedance can vary as much as 70% with temperature over the normal operating range of the circuit breaker depending upon the type of bimetallic material used.

FIG. 1, for example, plots the resistivity (RTY) (ohms circular mil-foot) of a type 6250 bimetal material manufactured by Chace Thermostatic Metals versus temperature (RTemp) (degrees Celsius). As is typical with most metals, the bimetal impedance has a positive temperature coefficient (PTC). In other words, resistance increases with temperature. This variation can cause proportional inaccuracies in the measurement of the load current, thereby affecting performance of control algorithms implemented in the circuit breaker electronics. As bimetal temperature rises, the voltage drop across the bimetal increases for a given amount of load current. The net effect is that the load current appears larger than it really is. Depending on the control algorithm, the potential result could be an errant command to trip the circuit breaker.

FIG. 2 shows an operational amplifier U1 employing thermistor linearization. A linear voltage output, which varies with temperature, is provided by the operational amplifier and a linearized thermistor network including thermistor T1, parallel resistor R1 and series resistor R2. The voltage output decreases linearly as temperature increases. For example, this circuit may be calibrated by adjusting resistor R3 for an output voltage of 200 mV at 25° C. and 0 V at 45° C.

It is known to employ negative temperature coefficient (NTC) thermistors to compensate for the temperature coefficient response of various components, such as crystal oscillators, mechanical meters and infrared LEDs. FIG. 3 shows a thermistor/resistor network, including thermistor T2, parallel resistor R5 and series resistor R4, placed in parallel with a PTC component METER having a copper coil requiring compensation. The values of the resistors R4 and R5 are selected to provide the proper NTC slope to offset the PTC component.

As shown in FIG. 4, the PTC component response $R_P$ and the NTC component response $R_N$ combine to provide a net effect in the form of a substantially constant meter circuit response $R_M$ that is substantially independent of temperature.

There is room for improvement in circuit breakers and trip assemblies for circuit breakers.

SUMMARY OF THE INVENTION

The present invention is directed to a circuit breaker, which compensates for bimetal electrical resistance variation with temperature when, for example, sensing current indirectly from bimetal voltage.

As one aspect of the invention, a circuit breaker comprises: separable contacts; a latchable operating mechanism including a latch member which when released opens the separable contacts; a bimetal in series with the separable contacts and adapted for heating by current flowing therethrough, the bimetal including a temperature, a temperature coefficient, a first terminal, and a second terminal having a voltage, the bimetal being adapted to deflect by the heating, the bimetal coupled to the latch member to release the latch member in response to a persistent overcurrent condition; and a trip assembly comprising: a thermistor adapted to respond to the temperature of the bimetal, an amplifier having a first input, a second input and an output, a first resistor electrically connected between the second terminal of the bimetal and the first input of the amplifier, a second resistor electrically connected in parallel with the thermistor, a third resistor electrically connected in series with the parallel combination of the second resistor and the thermistor, with the series combination of the third resistor and the parallel combination of the second resistor and the thermistor being electrically connected between the first input of the amplifier and the output of the amplifier, the second input of the amplifier being referenced to the first terminal of the bimetal, the output of the amplifier having a voltage which is compensated for the temperature coefficient of the bimetal, means for providing a trip signal as a function of the compensated voltage, and means for releasing the latch member to trip the separable contacts open in response to the trip signal.

The first terminal of the bimetal may have a voltage, the means for providing a trip signal may have a ground which is the voltage of the first terminal of the bimetal, the amplifier may be an operational amplifier having an inverting input as the first input and a non-inverting input as the second input, and a fourth resistor may be electrically connected between the non-inverting input and the ground.

As another aspect of the invention, a method of operating a circuit breaker comprises the steps of: employing a bimetal having a temperature coefficient in series with separable contacts of the circuit breaker; heating the bimetal to a temperature by passing current through the series combination of the bimetal and the separable contacts; employing a thermistor having a first terminal and a second terminal to respond to the temperature of the bimetal; employing an amplifier having a first input, a second input and an output; electrically connecting a first resistor between the second terminal of the bimetal and the first input of the amplifier, electrically connecting a second resistor in parallel with the thermistor; electrically connecting a third resistor in series with the parallel combination of the second resistor and the thermistor; electrically connecting the series combination of the third resistor and the parallel combination of the second resistor and the thermistor between the first input of the amplifier and the output of the amplifier; referencing the second input of the amplifier to the first terminal of the bimetal; outputting a voltage from the output of the amplifier; providing a trip signal as a function of the voltage; and opening the separable contacts of the circuit breaker in response to the trip signal.

As a further aspect of the invention, a trip assembly for a circuit breaker comprises: a bimetal adapted for connection in series with separable contacts of the circuit breaker and adapted for heating by current flowing therethrough, the bimetal including a temperature, a temperature coefficient, a first terminal, and a second terminal having a voltage; a thermistor adapted to respond to the temperature of the bimetal; an amplifier having a first input, a second input and an output; a first resistor electrically connected between the second terminal of the bimetal and the first input of the amplifier; a second resistor electrically connected in parallel with the thermistor; a third resistor electrically connected in series with the parallel combination of the second resistor and the thermistor, with the series combination of the third resistor and the parallel combination of the second resistor and the thermistor being electrically connected between the first input of the amplifier and the output of the amplifier, the second input of the amplifier being referenced to the first terminal of the bimetal, the output of the amplifier having a voltage; and means for providing the trip signal as a function of the voltage of the output of the amplifier.

As another aspect of the invention, a bimetal compensation circuit is for a circuit breaker having separable contacts and a bimetal electrically connected in series with the separable contacts and adapted for heating by current flowing therethrough. The bimetal compensation circuit comprises: a thermistor adapted to respond to a temperature of the bimetal; an amplifier having an input and an output; a first resistor electrically connected between a second terminal of the bimetal and the input of the amplifier; a second resistor electrically connected in parallel with the thermistor; and a third resistor electrically connected in series with the parallel combination of the second resistor and the thermistor, with the series combination of the third resistor and the parallel combination of the second resistor and the thermistor being electrically connected between the input of the amplifier and the output of the amplifier, the output of the amplifier having a voltage, which is compensated for a temperature coefficient of the bimetal.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to a subminiature circuit breaker for use in aircraft alternating current (AC) systems, which are typically 400 Hz, but can also be used in direct current (DC) systems. It will also become evident that the invention is applicable to other types of circuit breakers including those used in AC systems operating at other frequencies; to larger circuit breakers, such as miniature residential or commercial circuit breakers; and to a wide range of circuit breaker applications, such as, for example, residential, commercial, industrial, aerospace, and automotive. As further non-limiting examples, both AC (e.g., 120, 220, 480–600 VAC) operation at a wide range of frequencies (e.g., 50, 60, 120, 400 Hz) and DC operation (e.g., 42 VDC) are possible.

Figure 5:
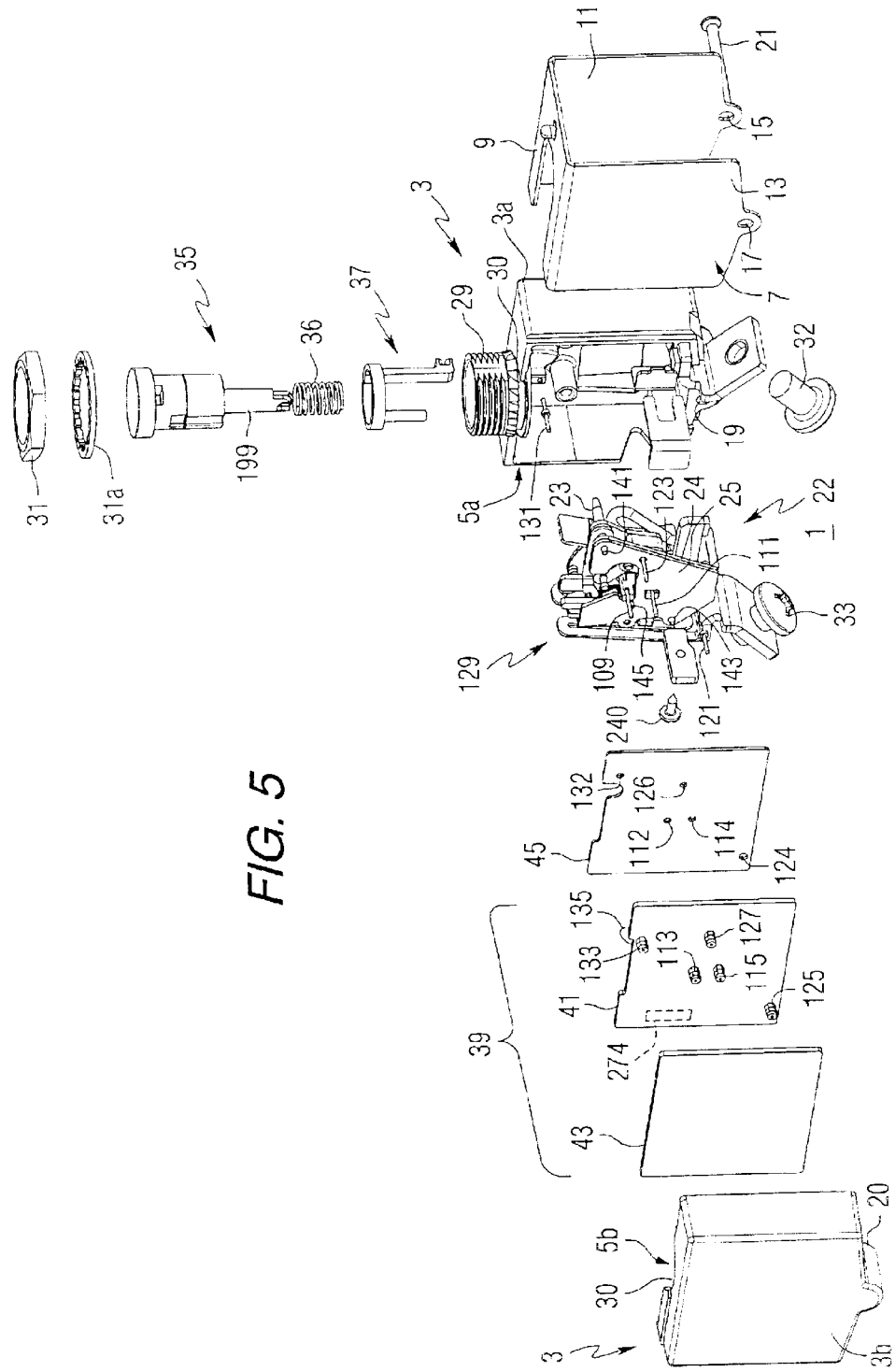
FIG. 5 is an exploded isometric view of a circuit breaker in accordance with the present invention.
Figure 6:
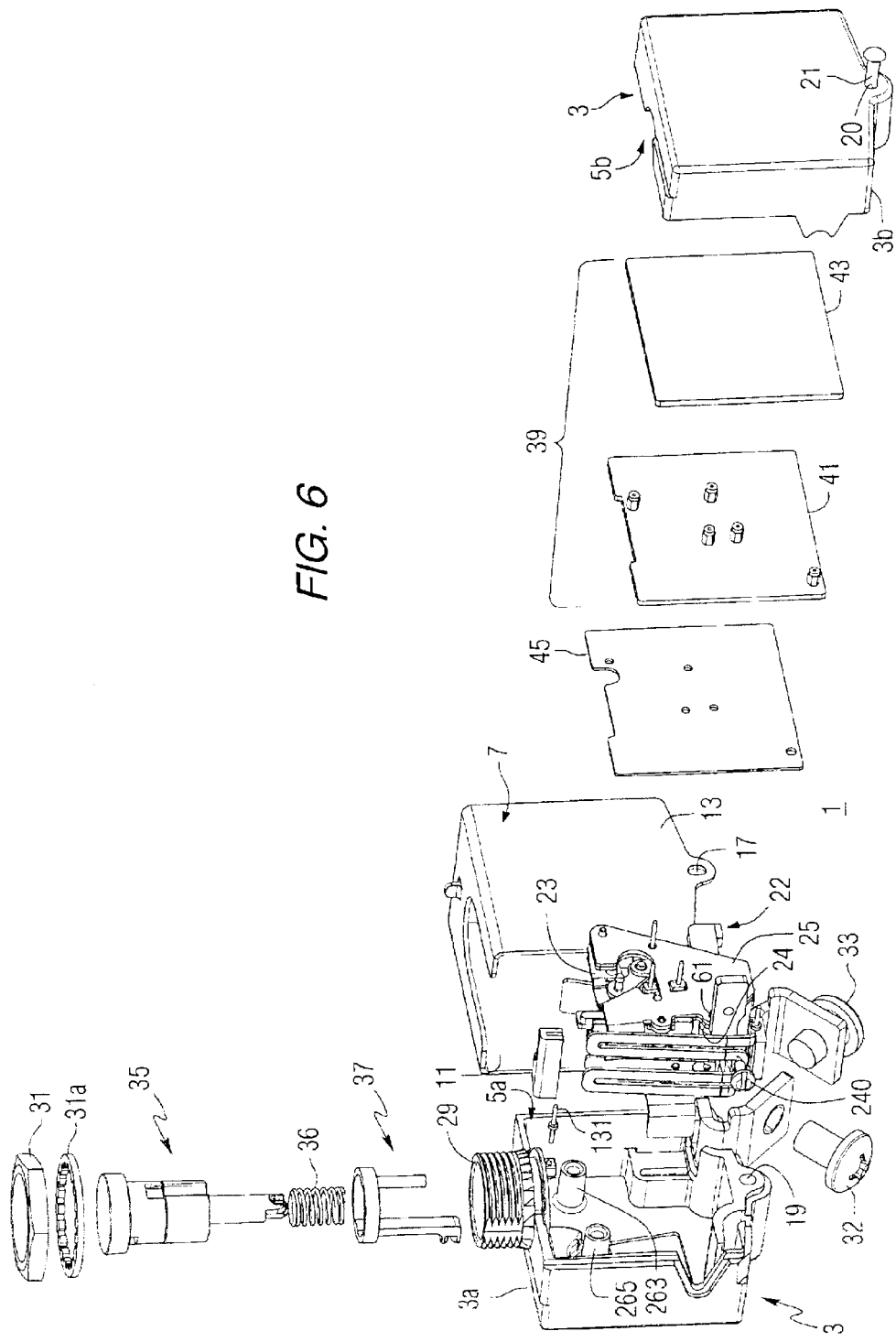
FIG. 6 is another exploded isometric view from the opposite end of FIG. 5.

Referring to FIGS. 5 and 6, an exemplary circuit breaker 1 has a housing 3 formed by first and second sections 3a and 3b molded of an insulative resin which sections are joined along a mating plane to form an enclosure from confronting cavities 5a and 5b, respectively. The circuit breaker 1 also includes an external clip plate 7 having a top 9 and two sides 11,13 disposed therefrom. The clip plate side 11 captures the section or molded case 3a and the other clip plate side 13 captures the other section or molded cover 3b. Each of the sides 11,13 includes an opening 15,17, respectively, proximate the bottom of the corresponding side. The molded case 3a and the molded cover 3b each have a respective opening 19 and 20 therethrough. A fastener 21, such as a rivet, is disposed through the opening 15 of the side 11, through the openings 19,20 of the molded case 3a and the molded cover 3b, and through the opening 17 of the side 13, in order to draw the one side 11 toward the other side 13 and, thereby, secure the molded case 3a to the molded cover 3b.

Figure 10:
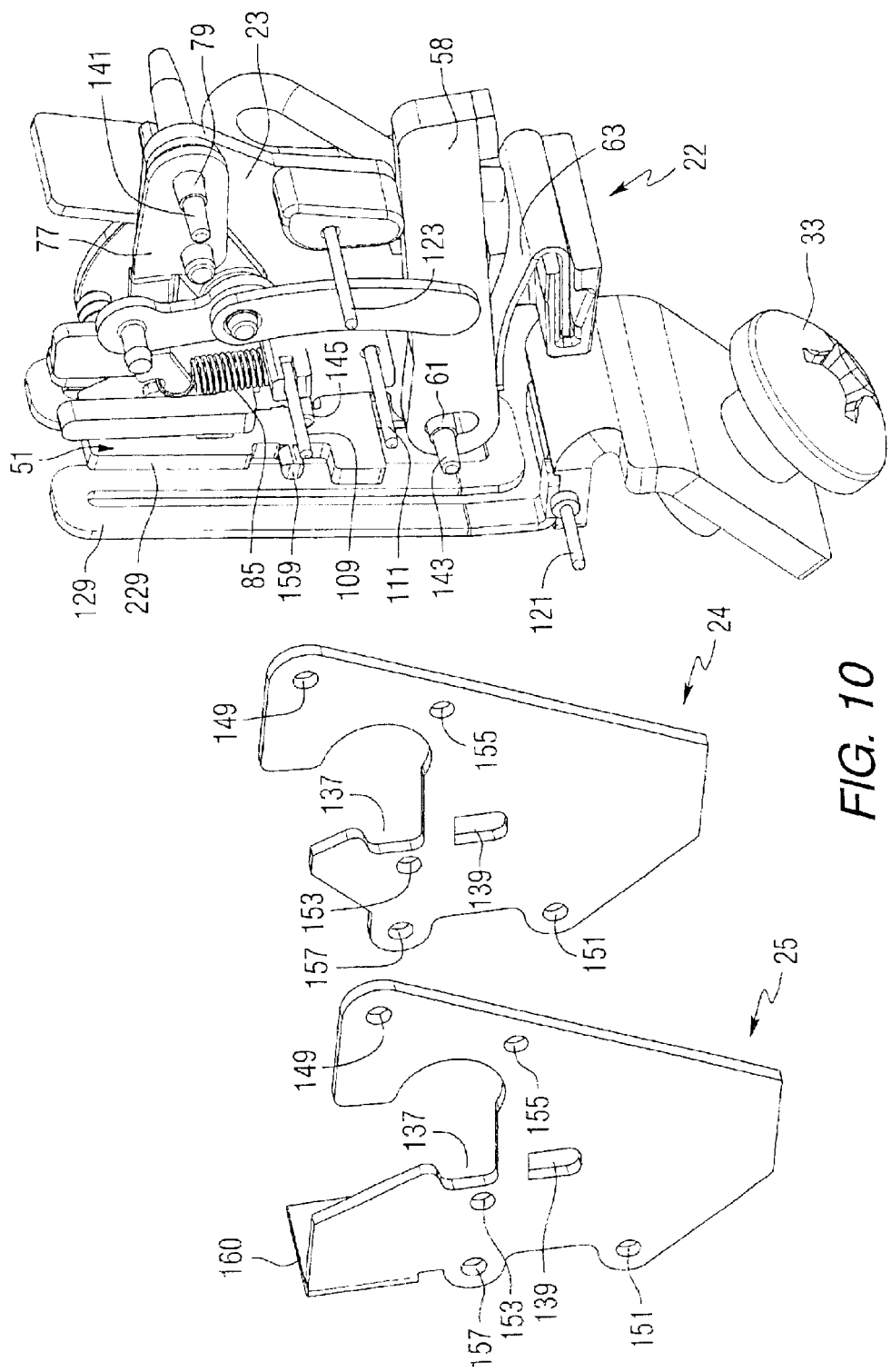
FIG. 10 is an exploded isometric view of the operating mechanism and two top plates of the circuit breaker of FIG. 5.
Figure 11:
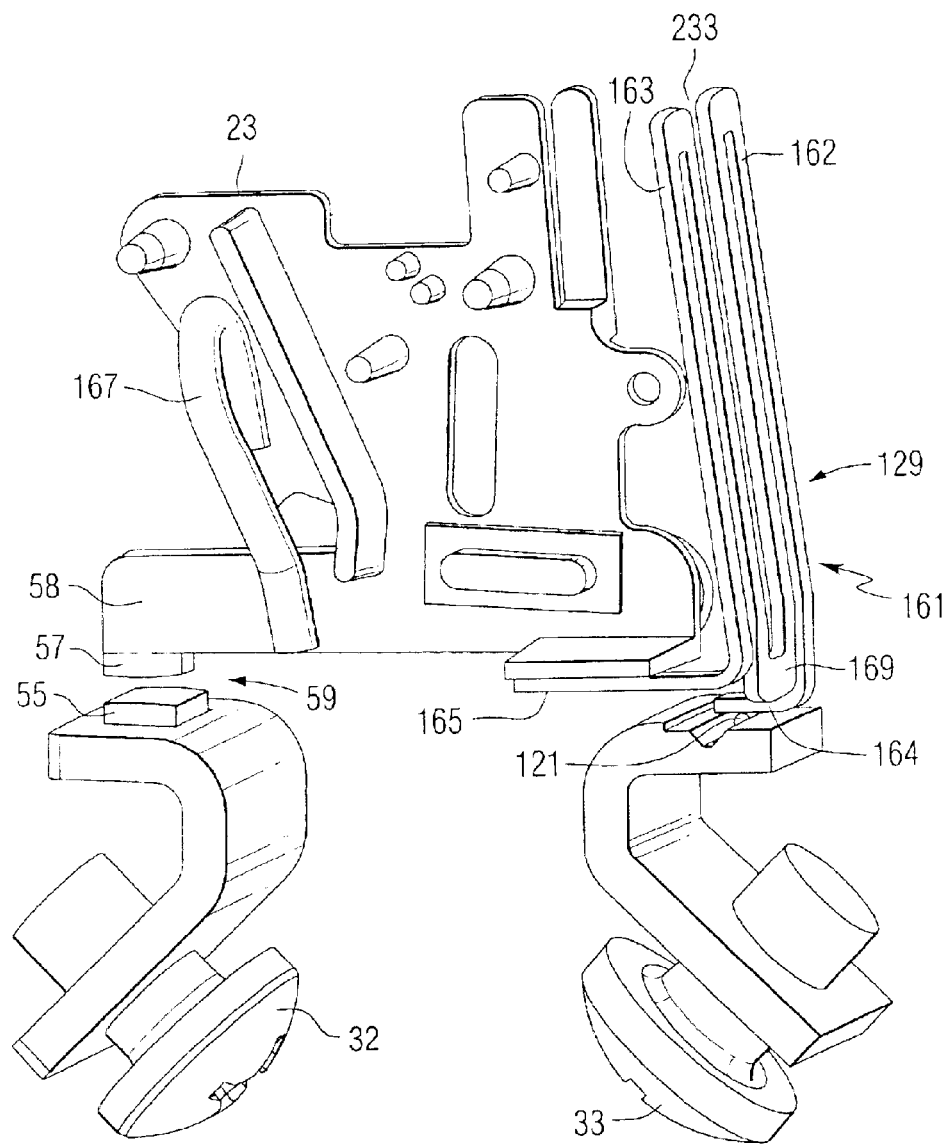
FIG. 11 shows an isometric view of the load terminal, bimetal, mechanism plate, movable contact arm and line terminal of the circuit breaker of FIG. 5.

The circuit breaker 1 further includes an operating mechanism 22 mounted on a support mechanism such as the exemplary mechanism jig plate 23 (as best shown in FIGS. 10 and 11), a first mechanism top plate 24, a second mechanism top plate 25 (the top plates 24,25 are best shown in FIG. 10), and a bezel 29 mounted in an opening 30 of the housing 3. The bezel 29 is held in place by the external clip plate 7 and housing 3. In turn, a suitable fastener, such as the exemplary nut 31 and washer 31a mount the circuit breaker 1 to a mounting panel (not shown). The circuit breaker 1 also includes a line terminal 32, a load terminal 33, and an operating handle assembly 35, which protrudes through the opening 30 and the bezel 29. The operating handle assembly 35 is suitably biased away from the opening 30 by a spring 36. For ON/OFF operation, the handle assembly 35 is driven up by springs 63 (FIG. 7) and 36. Spring 36 is employed on trip operations to reset the handle assembly 35 to the OFF position.

The circuit breaker 1 further includes a movable and illuminable arc fault indicator 37, an arc fault detector 39 including exemplary printed circuit boards (PCBs) 41,43, and an insulator 45. Suitable arc fault detectors are disclosed, for instance, in U.S. Pat. Nos. 5,224,006; 5,691, 869; and 5,818,237, which are hereby incorporated by reference. In the exemplary embodiment, the mechanism plate 23 is electrically conductive and is preferably made of stainless steel or brass. The operating mechanism 22 is assembled to and supported by the mechanism plate 23, which is mounted in the cavity 5a of the molded section 3a, and the PCBs 41,43 are mounted in the cavity 5b of the molded section 3b.

Figure 7:
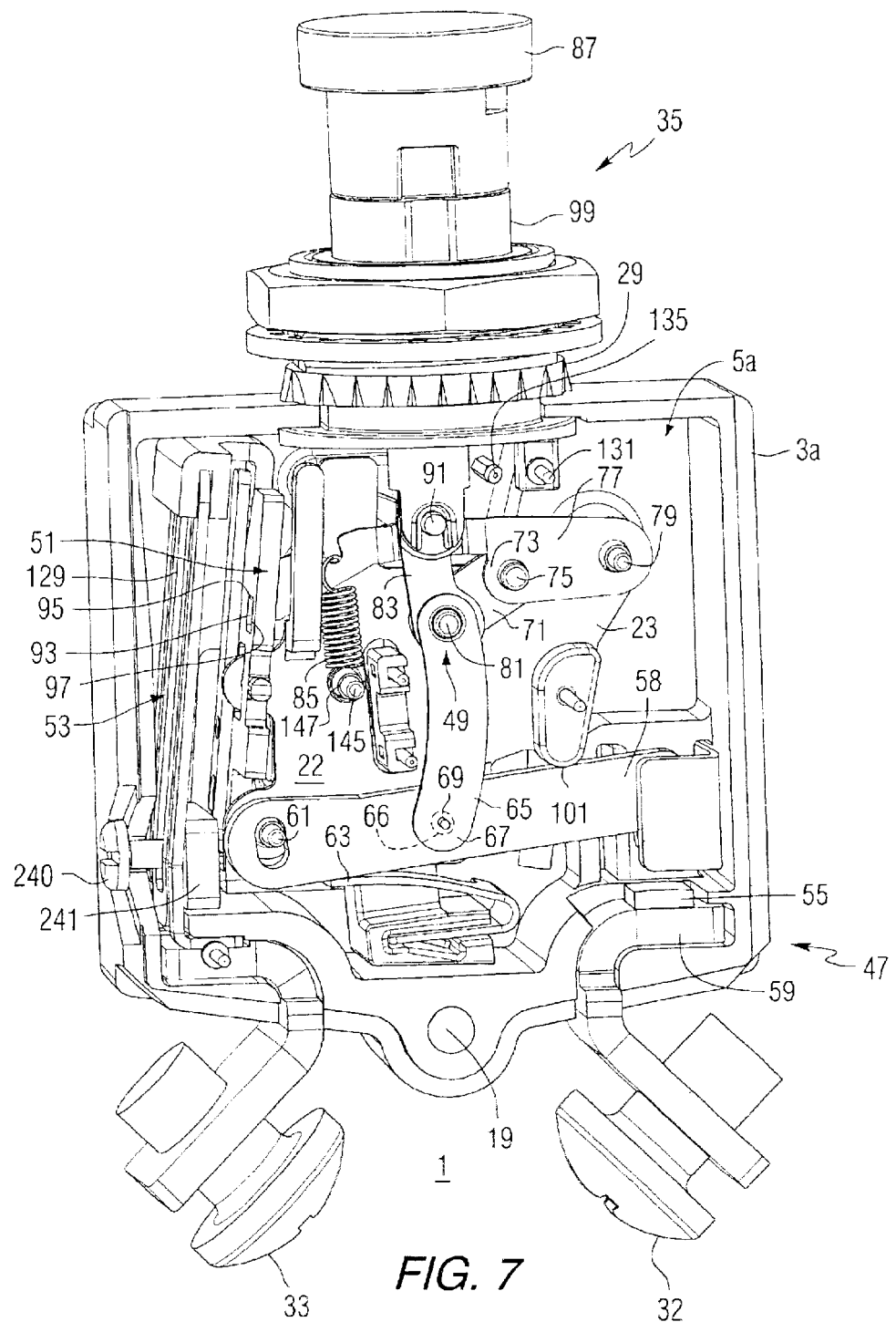
FIG. 7 is a front elevation view of the circuit breaker of FIG. 5, with one-half of the cover and two top plates removed, showing the circuit breaker in the off condition.
Figure 8:
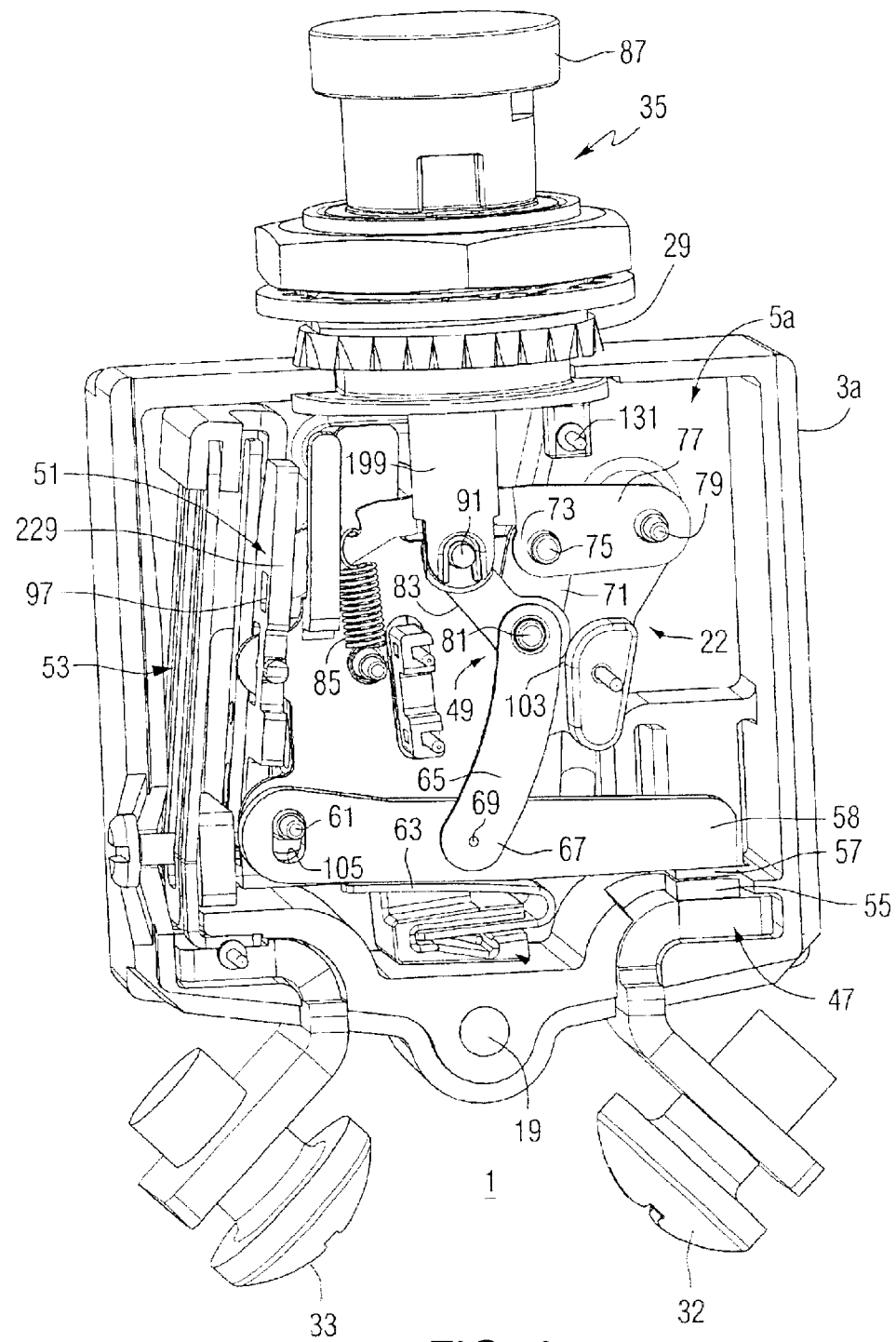
FIG. 8 is a view similar to FIG. 7 but showing the circuit breaker in the on condition.
Figure 9:
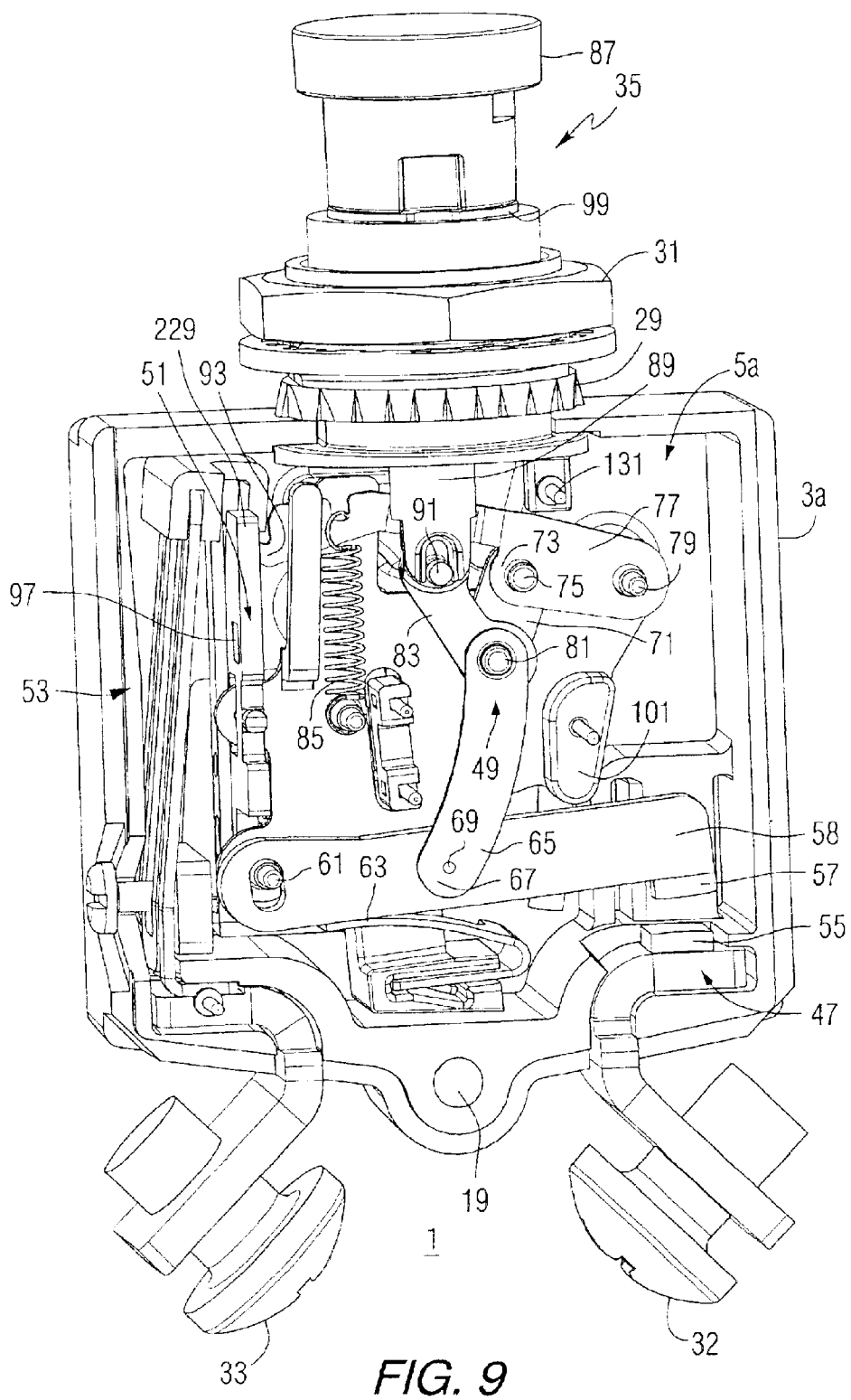
FIG. 9 is a view similar to FIG. 7 but showing the circuit breaker in the tripped condition.

Referring to FIGS. 7–9, the functional components of the circuit breaker 1 include a separable contact assembly 47 (as best shown in FIGS. 8 and 9), a toggle mechanism 49, the handle assembly 35, a latch member assembly 51, and an overcurrent assembly 53. The toggle mechanism 49, handle assembly 35, and latch assembly 51 form the latchable operating mechanism 22. The circuit breaker 1 also includes the line terminal 32 and the load terminal 33 supported in the bottom of the molded case 3a and having cantilevered sections extending outside of the case 3 for connection to respective line and load conductors (not shown).

As discussed below in connection with FIG. 12, the overcurrent assembly 53 includes the PCBs 41,43 and a trip motor 119 (for arc fault conditions), and a bimetal 129 (for persistent overcurrent conditions). The overcurrent assembly 53 also includes an instantaneous trip function, which like the trip motor 119 and bimetal 129, actuate the latch assembly 51 to trip open the separable contact assembly 47.

The separable contact assembly 47 includes a fixed contact 55 fixed to the line terminal 32 and a movable contact 57 (FIGS. 8 and 9) carried by and electrically connected to a movable contact arm 58 within the housing 3. The fixed contact 55 and movable contact 57 together form a set of separable contacts 59. The contact arm 58 is pivotally mounted on a metal pin 61, which is part of mechanism plate 23. The plates 24,25 (FIG. 10) retain the contact arm 58 on the pin 61. A cantilever leaf spring 63 forms a main spring, which biases the contact arm 58 counter-clockwise (with respect to FIGS. 7-9) to open the separable contacts 59 (as shown in FIG. 9). As discussed below in connection with FIG. 11, the load terminal 33 is electrically interconnected with the contact arm 58 and the movable contact 57, and the line terminal 32 is electrically connected to the fixed contact 55. The latchable operating mechanism 22 functions to open (FIGS. 7 and 9) and close (FIG. 8) the separable contacts 59.

The contact arm 58 is pivoted between open (FIG. 7) and closed (FIG. 8) positions of the separable contacts 59 by the toggle mechanism 49. This toggle mechanism 49 includes a lower toggle link 65 pivotally connected by a pin 66 (shown in hidden line drawing in FIG. 7) at a first or lower end 67 to the contact arm 58 at a pivot point 69. In this manner, the toggle mechanism 49 is mechanically coupled to the separable contacts 59 for opening and closing such separable contacts.

A second toggle link 71 is pivotally connected at a first or upper end 73 by a pin 75 to a latch lever 77, which in turn is pivotally mounted by a metal pin 79 that is part of mechanism plate 23. The second ends of the first toggle link 65 and the second toggle link 71 are pivotally connected by a knee pin 81. The toggle mechanism 49 further includes a drive link 83, which mechanically couples the toggle mechanism 49 to the handle assembly 35.

Whenever the latch assembly 51 is actuated, the latch lever 77 is unlatched and the main spring 63 drives the movable contact arm 58 upward in order to open the separable contacts 59. Also, through movement of the links 65,71, the latch lever 77 is rotated clockwise (with respect to FIG. 9). From this tripped position, the spring 36 (FIGS. 5 and 6) returns the handle assembly 35 to the OFF position, and the latch lever return spring 85 returns the latch lever 77, in order that it can be engaged by the latch member assembly

51. Otherwise, the latch assembly 51 latches the latch lever 77 and the toggle mechanism 49 in a latched condition (FIGS. 7 and 8) in which the toggle mechanism 49 is manually operable by the handle assembly 35 between a toggle open position (FIG. 7) and a toggle closed position (FIG. 8) to open and close the separable contacts 59.

As can be seen from FIG. 9, the handle assembly 35 includes a handle member 87 having a stem 89. The drive link 83 of the toggle mechanism 49 is pivotally connected to the stem 89 by a pin 91. The handle member 87 is supported for reciprocal linear movement by the bezel 29. The latch lever 77 has a finger 93 terminating in a hook 95 (FIG. 7), which engages (FIGS. 7 and 8) an opening 97 in the latch assembly 51.

The exemplary circuit breaker 1 operates in the following manner. In the OFF position (FIG. 7), which is the toggle open position of the toggle mechanism 49, the handle member 87 is up with an indicator portion 99 of the stem 89 visible to indicate the OFF condition. The latch lever 77 is latched by engagement of its hook 95 by the opening 97 in the latch assembly 51. The main spring 63 has rotated the movable contact arm 58 counter-clockwise (with respect to FIG. 7) against a stop portion 101 of the mechanism plate 23 so that the separable contacts 59 are open.

Depressing the handle member 87, which moves linearly downward to the position shown in FIG. 8, turns ON the circuit breaker 1. The drive link 83 pushes the knee pin 81 downward and to the right, and the first toggle link 65 downward, which results in clockwise rotation (with respect to FIGS. 7 and 8) of the movable contact arm 58 against the main spring 63. As the upper end of the second (upper) toggle link 71 is held stationary by the latch lever 77, the toggle mechanism 49 in general, and the first (lower) link 65 in particular, seats against a stop portion 103 of the mechanism plate 23 in the toggle closed position shown in FIG. 8. This latter motion occurs through clockwise rotation (with respect to FIG. 8) of the contact arm 58, which is pivotally mounted on the pin 61 at the slotted aperture 105 thereof. With the separable contacts 59 closed in this manner, the main spring 63 provides contact pressure on the separable contacts 59 and accommodates for wear.

The circuit breaker 1 may be manually opened from the ON position (FIG. 8) to the OFF position (FIG. 7) by raising the handle member 87. Initially, a downward force is applied to the contact arm 58 through the first toggle link 65. However, when the knee pin 81 passes through the center line between the pins 91 and 75, the toggle mechanism 49 breaks and the main spring 63 rotates the movable contact arm 58 counter-clockwise (with respect to FIGS. 7 and 8) until it seats against the stop 101 with the separable contacts 59 open. In turn, the handle 87 rises to the OFF position (FIG. 7).

As discussed below in connection with FIGS. 7 and 12 (persistent overcurrent conditions), FIG. 16 (arc fault conditions), and FIGS. 7–10 (instantaneous trip conditions), the circuit breaker 1 can be tripped (FIG. 9) to the open condition under various conditions. Regardless of such conditions, the latch assembly 51 releases the latch lever 77, which is driven clockwise (with respect to FIGS. 8 and 9) about the pin 79. Also, the movable contact arm 58 is driven counter-clockwise (with respect to FIGS. 8 and 9) through the main spring 63 to open the separable contacts 59.

In this transitory trip position, the handle member 87 is down, the latch lever 77 is rotated clockwise, and the movable contact arm 58 is in the open position. From this position, the handle spring 36 returns the handle member 87 to the OFF position and the latch lever spring 85 rotates the latch lever 77 counter-clockwise to a position where it can be engaged by the latch assembly 51. This is the OFF position.

The lower end of the handle spring 36 engages an inside surface (not shown) of the bezel 29. The inside of the bezel 29 forms a cup (not shown), with a relatively small hole (not shown) in the center thereof. That hole is of sufficient size, in order to permit the relatively small end 199 (FIG. 8) of the handle 35 to pass therethrough. The handle spring 36 biases the handle 35 in the direction away from the bezel 29, in order to drive the handle to the OFF position. In the ON position (FIG. 8), links 65,71 have passed straight alignment (and, thus, have passed the toggle position), and the main spring 63 prevents the handle 35 from opening. The forces of the main spring 63 and the handle spring 36 are predetermined in order that the main spring 63 prevents the handle spring 36 from opening the circuit breaker 1. If the circuit breaker 1 is tripped (FIG. 9), then the main spring 63 drives the movable contact arm 58 to the stop 101, and the force of the main spring is no longer involved in the force balance. Hence, the handle spring 36 can then move the handle 35 to the OFF position. Otherwise, when the circuit breaker 1 is ON and a user pulls on the handle 35, that force is added to the handle spring force until there is sufficient force to overcome the main spring force and open the circuit breaker.

Referring to FIGS. 5 and 10, there are five exemplary electrical connections to the first PCB 41. Additional pins (not shown) electrically interconnect the PCBs 41,43. Two terminals 109,111 pass through openings 112,114 of the insulator 45 and electrically connect mating terminals 113, 115, respectively, of the PCB 41 to a coil assembly 117 of a trip motor or electromagnet assembly 119 (e.g., a solenoid of FIG. 12). Another two terminals 121,123 pass through openings 124,126 of the insulator 45 and electrically connect mating terminals 125,127, respectively, of the PCB 41 across the series combination of a bimetal 129 and the mechanism plate 23, in order to sense current flowing to the load terminal 33. The terminal 121 is electrically connected to the load terminal 33 and to one end (164 as best shown in FIG. 11) of the bimetal 129. The other terminal 123 is electrically connected to the mechanism plate 23, which is electrically connected to the other end (165 as best shown in FIG. 11) of the bimetal 129.

The electronic circuit (FIG. 16) of the PCBs 41,43 employs the voltage between the terminals 125,127. Circuit breaker load current may be determined from the known resistance (e.g., about 5 to 100 milliohms depending on rated current) of the series combination of the bimetal 129 and mechanism plate 23 (i.e., I=V/R). In turn, the electronic circuit determines if an arc fault condition is present and, if so, employs the terminals 113,115, in order to energize the coil assembly 117 and effect an arc fault trip (as discussed below in connection with FIG. 16). A fifth terminal 131 (FIGS. 5–9), which is electrically connected to the bezel 29, passes through opening 132 of the insulator 45 and is electrically connected to mating terminal 133 of the PCB 41, in order to provide a suitable external AC ground reference thereto. The PCBs 41,43 derive power from voltage between the terminals 123,131. Whenever a suitable voltage is present, the PCBs 41,43 illuminate a light emitting diode (LED) 135 (FIG. 5), which is employed in connection with the arc fault indicator 37, as shown near the bottom of the bezel 29 of FIG. 7.

As shown in FIGS. 5 and 10, the terminals 109 and 111 pass through corresponding openings 137 and 139, respectively, of mechanism top plates 24,25, without electrically contacting those plates. The mechanism top plates 24,25 are held in place by three rivet pins 141, 143 and 145 formed on the metal pin 79, the metal pin 61, and a metal pin 147 (as best shown in FIG. 7), which holds the bottom end of the spring 85, respectively. In turn, the rivet pins 141, 143,145 engage the mechanism top plates 24,25 at corresponding openings 149,151,153, respectively, thereof. The pin 123, which is electrically connected to the mechanism plate 23, electrically engages the top plates 24,25 at the opening 155. Another opening 157 of the top plates 24,25 pivotally supports a pivot point 159 of the latch assembly 51.

The exemplary top plates 24,25 have a similar, but non-identical shape, with the first top plate 24 being cut away in some areas in order to maintain clearance for certain moving parts of the operating mechanism 22, and the second top plate 25 adding thickness to the first top plate 24 and providing an L-shaped portion 160 for the instantaneous (magnetic) trip function as discussed below in connection with FIGS. 7–10. Preferably, the plates 24,25 are initially formed from the same die.

FIG. 11 shows the load terminal 33, an overcurrent assembly 161 which includes the bimetal 129, the mechanism plate 23, the movable contact arm 58, the separable contacts 59 and the line terminal 32 of the circuit breaker 1 of FIG. 5. The bimetal 129 has two leg portions 162,163 and is fixed and electrically connected at one end or a foot 164 to the load terminal 33. The other bimetal end or a foot 165 engages and is electrically connected to the mechanism plate 23, which, in turn, is electrically connected to the movable contact arm 58 by a pigtail, such as flexible braided conductor 167, which is suitably electrically attached (e.g., by welding) at each end. In this manner, the load current flows from the line terminal 32 to the fixed contact 55, to the movable contact 57, to the movable contact arm 58, to the braided conductor 167, and to the mechanism plate 23, before passing through the bimetal 129 and to the load terminal 33. In the exemplary embodiment, the bimetal 129 is designed for 2.5 A rated load current, although the invention is applicable to a wide range of rated currents (e.g. 15 A or greater). The load current causes $I^2R$ heating of the bimetal 129 resulting in movement of its upper portion (with respect to FIG. 11) to the right side of FIG. 11, with all of the exemplary load current flowing through the bimetal 129. A 15 A bimetal, for example, is U-shaped, and has almost three times the cross section of the exemplary bimetal 129, and can carry more current without fusing.

The exemplary bimetal 129 includes an intermediate U-shaped section 169, which is electrically connected in series between the leg 162 and the foot 164 and the leg 163 and the foot 165. As discussed below in connection with FIG. 12, the bimetal 129 deflects in response to heating caused by certain values of load current flowing through the separable contacts 59 to actuate the latch assembly 51. Hence, the bimetal 129 is responsive to selected conditions (e.g., overload, fault current conditions) of such load current and actuates the operating mechanism 22 through the trip latch 229 (FIG. 12) in order to trip open the separable contacts 59.

The exemplary mechanism plate 23 provides improved support for the bimetal 129 since the foot 165 of the bimetal 129 is attached to the plate 23. This provides improved routing of current through the bimetal 129 from the separable contacts 59, to the movable contact arm 58, to the conductor 167, to the plate 23, and to the bimetal foot 165, which is attached to the plate 23. Furthermore, this provides a simpler routing of the conductor 167 (i.e., from the plate 23 to the movable contact arm 58), rather than from the bimetal foot 165 or leg 163 to the movable contact arm 58).

Figure 12:
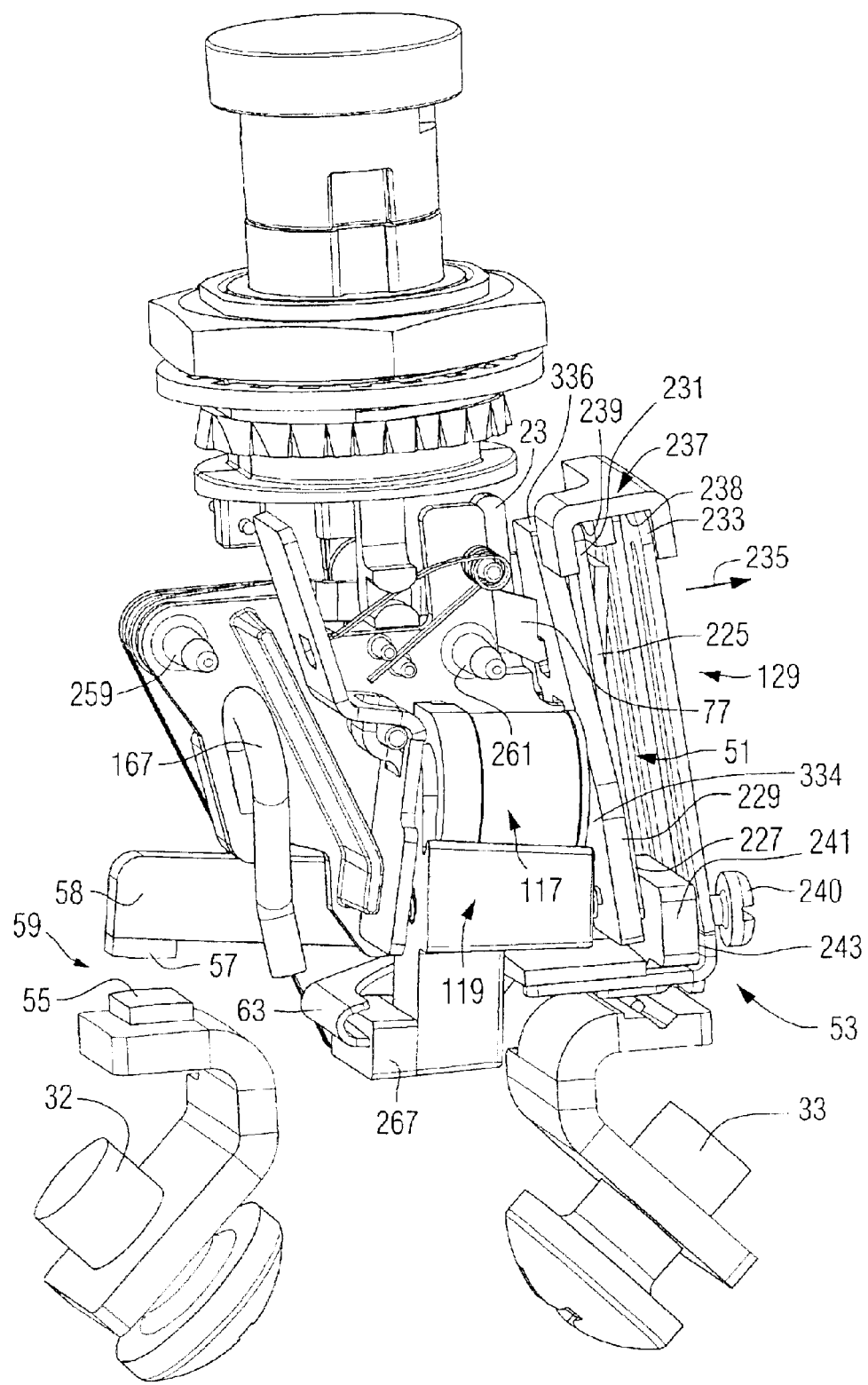
FIG. 12 is an isometric view of the trip motor and bimetal of the circuit breaker of FIG. 5.

FIG. 12 shows the overcurrent assembly 53 including the trip motor or electromagnet assembly 119 and the bimetal 129. A cantilevered ambient compensation bimetal 225 is operatively associated with the bimetal 129. One end 227 of this ambient compensation bimetal 225 is suitably fixed to a trip latch member 229 of the latch assembly 51, such as by spot welding. The cantilevered ambient compensation bimetal 225 extends upward (with respect to FIG. 12) to terminate in a free end 231, which is adjacent to a free end 233 of the bimetal 129. Under normal operating conditions, there is a gap between the free end 233 of the bimetal 129 and the free end 231 of the ambient compensation bimetal 225. When the bimetal 129 is heated, it moves to the right (with respect to FIG. 12) as shown by line 235. An exemplary shuttle 237 made of plastic or some other suitable insulating material has notches 238 and 239, which engage the free ends 233 and 231 of the bimetal 129 and the ambient compensation bimetal 225, respectively. The bimetal 129, when heated, moves the shuttle 237, thus, pulling on the ambient compensation bimetal 225, which, in turn, is coupled to the trip latch 229. An increase or decrease in ambient temperature conditions cause the free end 233 of the bimetal 129 and the free end 231 of the ambient compensation bimetal 225 to move in the same direction and, thereby, maintain the appropriate gap between the two bimetal free ends 231,233, in order to eliminate the effects of changes in ambient temperature. Hence, the bimetal 129 and the cantilevered ambient compensation bimetal 225 are coupled in series to the trip latch 229 to move the same in response to a persistent overcurrent condition as compensated for ambient conditions. Under overcurrent conditions, the bimetal 129, therefore, pulls on the ambient bimetal 225, which rotates the trip latch 229 of the latch assembly 51 clockwise (with respect to FIG. 12, or counter-clockwise with respect to FIG. 10) around the pivot point 159 (FIG. 10) and releases the latch lever 77 to trip the operating mechanism 22.

The thermal trip can be calibrated by a calibration screw 240, which engages the molded case 3a of FIG. 6 and which is threaded into a nut 241 disposed between a lower surface 243 of the bimetal 129 and the fixed end 227 of the ambient compensation bimetal 225. By further threading and tightening the screw 240 into the nut 241, the nut 241 engages the lower bimetal surface 243 and drives the bimetal free end 233 to the right (with respect to FIG. 12) as shown by line 235. Alternatively, reversing the screw 240 out of the nut 241, allows the bimetal free end 233 to return to the left (with respect to FIG. 12).

The exemplary circuit breaker 1 includes three different trip modes, all of which employ the trip latch 229 of FIG. 8 to actuate the operating mechanism 22 and trip open the separable contacts 59: (1) overcurrent conditions (i.e., thermal trip) detected by the bimetal 129 (FIGS. 11 and 12), which actuates the trip latch 229 through the shuttle 237 and ambient compensation bimetal 225; (2) arc fault (and/or ground fault) conditions detected by the PCBs 41,43, which energize the trip motor 119 to actuate the trip latch 229; and (3) relatively high current conditions (i.e., instantaneous trip), which also attract the trip latch 229 (FIGS. 7–10).

As shown in FIG. 12, the mechanism plate 23 has two posts 259,261, which engage corresponding holes 263,265 (FIG. 6) within the cavity 5a of the molded case 3a. Preferably, the posts 259,261 and holes 263,265 provide an alignment function, with the insulator 45, PCBs 41,43 and molded cover 3b, as secured by the clip plate 7, holding the operating mechanism 22, mechanism plate 23 and trip motor 119 within the housing 3 of FIG. 5.

In order to provide an instantaneous trip, the overcurrent assembly 53 of FIGS. 7–9 includes an arrangement for routing a current path of a main conductor, as formed by the bimetal 129, the mechanism plate 23, the flexible braid 167 and the movable contact arm 58, through a magnetic circuit, as formed by the motor frame 267 of FIG. 12 and the two steel mechanism top plates 24,25 of FIG. 10. The motor frame 267 and plates 24,25 form a steel shape around this current path. The discontinuous electrical conduction paths of the exemplary magnetic circuit direct the magnetic flux to flow once through the general path of the steel shape, thereby forming a one-turn electromagnet. Whenever load current flows in the circuit breaker 1, the steel shape magnetically attracts the steel trip latch 229. The magnetic coupling is such that suitably high load currents of at least a predetermined magnitude (e.g., without limitation, about 300 A for a 2.5 A rated load), such as those associated with short circuits, are sufficient to actuate the trip latch 229, without energizing the trip motor coil assembly 117. If the load current is of sufficient magnitude, then the trip latch 229 is rotated in the counter-clockwise direction (with respect to FIG. 9), thereby tripping the circuit breaker 1.

For example, magnetic flux flows around any current carrying conductor and, preferably, flows in steel. Hence, the exemplary steel shape around the exemplary load current path concentrates and channels the magnetic flux to flow through the exemplary steel path. Although the magnetic flux preferably flows in the steel, it also crosses any gaps in such steel. Therefore, the top plates 24,25 are preferably close to the motor frame 267, although physical connection is not required. When the magnetic flux crosses a gap in its path around the discontinuous electrical conduction paths, a force is generated toward closing that gap. Hence, since the steel path encompassing those conduction paths includes gaps between the motor frame 267 and the trip latch 229, and between the L-shaped portion 160 of the top plate 25 and the trip latch 229, forces are generated toward closing those gaps and, thus, actuating the trip latch 229.

Figure 13:
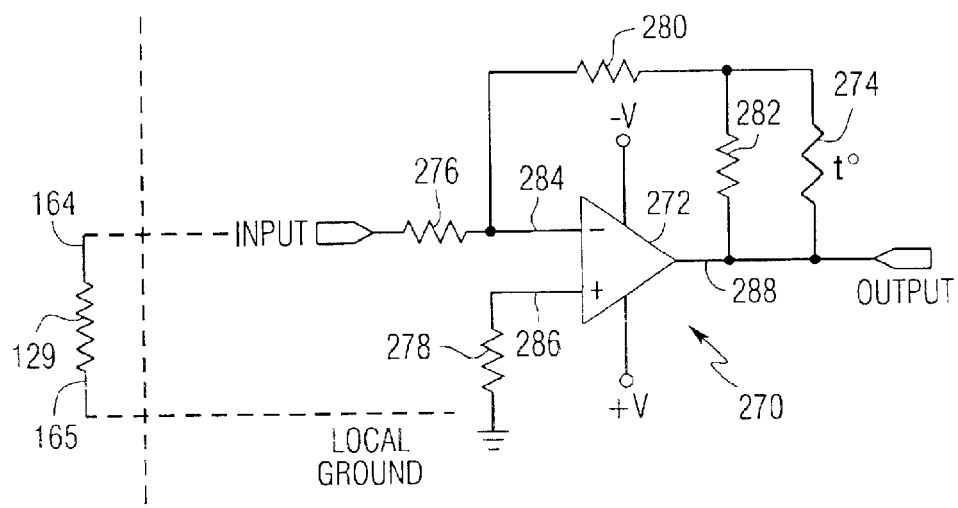
FIG. 13 is a block diagram in schematic form of a temperature compensated amplifier in accordance with the present invention.

FIG. 13 is a schematic of a circuit 270 employing an analog monolithic electronic operational amplifier 272 configured as an inverting amplifier. This circuit 270 includes a thermistor 274 as a temperature-sensing device, which is adapted to respond to the temperature of a bimetal element, in order to measure the approximate temperature of such element, such as the exemplary bimetal 129. The circuit 270 also includes four resistors 276,278,280,282. The operational amplifier 272 has an inverting input (−) 284, a non-inverting input (+) 286, and an output (Output) 288. The resistor 276 is electrically connected between a second terminal (Input) of the bimetal element and the amplifier inverting input (−) 284, and the resistor 282 is electrically connected in parallel with the thermistor 274. The resistor 280 is electrically connected in series with the parallel combination of the resistor 282 and the thermistor 274, with that series combination being electrically connected between the amplifier inverting input (−) 284 and the amplifier output 288. The amplifier non-inverting input (+) 286 is referenced to a first terminal (Local Ground) of the bimetal element. The amplifier output 288 has a voltage, which is compensated for the temperature coefficient of the bimetal element.

For example, under worst case conditions, when the circuit breaker 1 conducts rated current at extremely high ambient temperatures, the surface of the bimetal 129 could reach a temperature in excess of 200° C. Normally, thermistors are not rated to operate or even survive such extreme temperatures. However, if located in close proximity to a bimetal element, the thermistor will be subjected to less extreme temperatures since the power dissipated by the bimetal element is dispersed to the cooler ambient environment (e.g., within the circuit breaker housing 3). Even in close proximity, the temperature sensed by the thermistor 274 (e.g., as shown in hidden line drawing on the PCB 41 of FIG. 5 proximate the bimetal element 129), although less extreme, is still proportional to the actual temperature of the exemplary bimetal element 129. Through suitable selection of circuit component values, the gain of the amplifier 272 self-adjusts as the temperature of the bimetal element 129 rises, thereby improving the accuracy of the amplifier output 288 (e.g., the circuit breaker's load current measurement).

In the exemplary embodiment, the thermistor 274 exhibits a negative temperature coefficient (NTC). Preferably, a relatively inexpensive, commercially available thermistor is employed. One example is the ERTJ series marketed by Panasonic.

Equation 1 shows the gain, G, of the amplifier circuit 270:

$$G = -\left(\frac{RB + \frac{RC \cdot RT1}{RC + RT1}}{RA}\right) \quad \text{(Eq. 1)}$$

wherein:
RA is the resistance of resistor 276;
RB is the resistance of resistor 280;
RC is the resistance of resistor 282; and
RT1 is the resistance of thermistor 274.

As is apparent from Equation 1, the gain, G, is a ratio of the impedance of the feedback resistor network comprised of resistors 280,282 and thermistor 274 divided by the input resistance of resistor 276. The feedback resistor network is configured in such a way as to partially linearize its total resistance as a function of temperature. The impedance of thermistor 274 is inherently non-linear with temperature and a more linear change in gain is desired, in order to offset the nearly linear variation in the impedance of the bimetal element 129. The resistance, $R_T$, of a thermistor as a function of temperature is shown in Equation 2:

$$R_T = R_{TO} \cdot \exp\left(\frac{\beta(T_O - T)}{T \cdot T_O}\right) \quad \text{(Eq. 2)}$$

wherein:
$T_O$ is a reference temperature measured in degrees Kelvin;
$R_{TO}$ is thermistor resistance at the reference temperature, $T_O$;
$\beta$ is the specified material constant of the thermistor; and
T is the sensed temperature measured in Kelvins.

Figure 1:
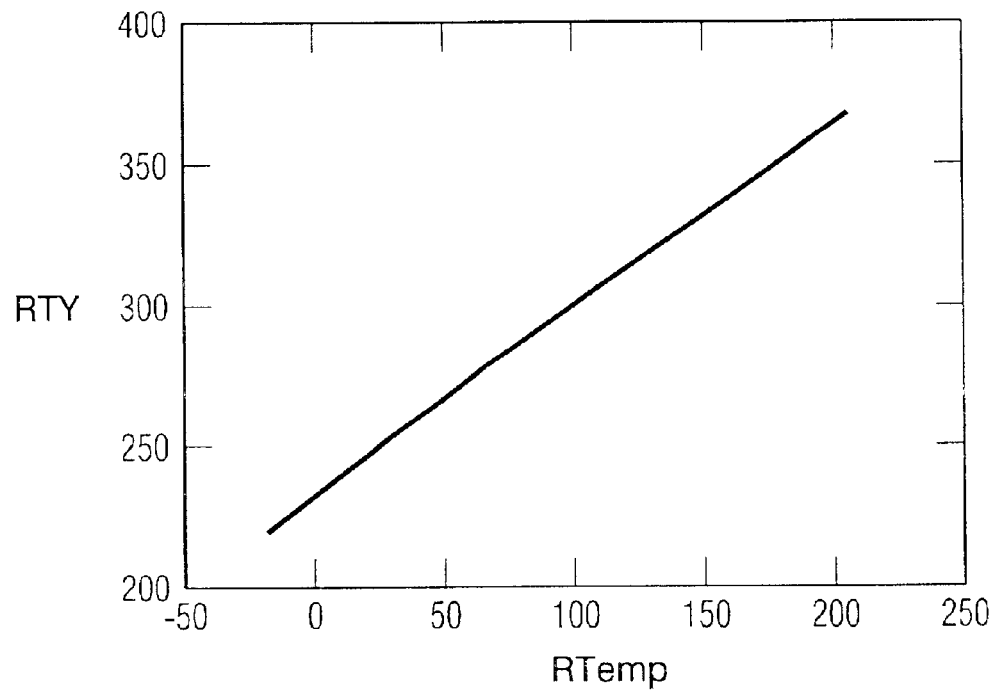
FIG. 1 is a plot of resistivity versus temperature of a bimetal material.
Figure 2:
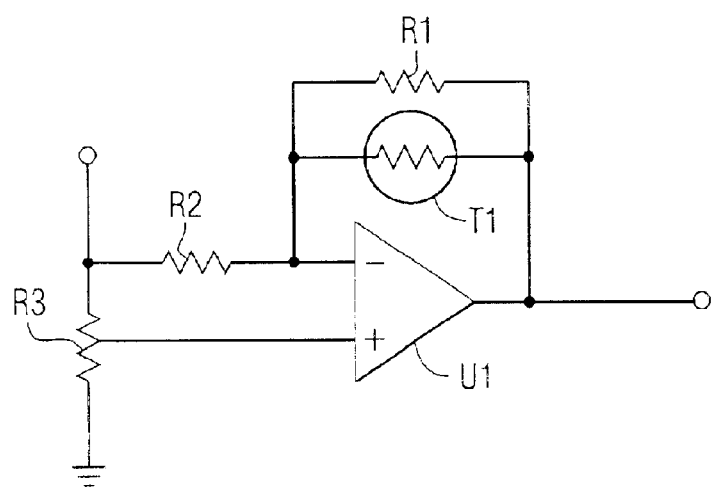
FIG. 2 is a block diagram in schematic form of an operational amplifier employing thermistor linearization.
Figure 3:
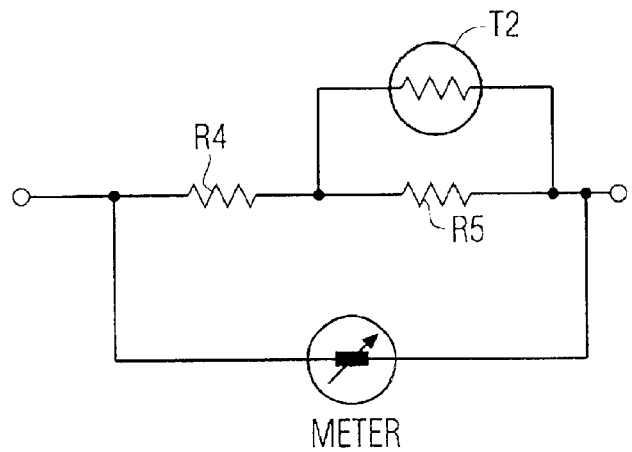
FIG. 3 is a block diagram in schematic form of a negative temperature coefficient (NTC) thermistor/resistor network in parallel with a positive temperature coefficient (PTC) meter component requiring compensation.
Figure 4:
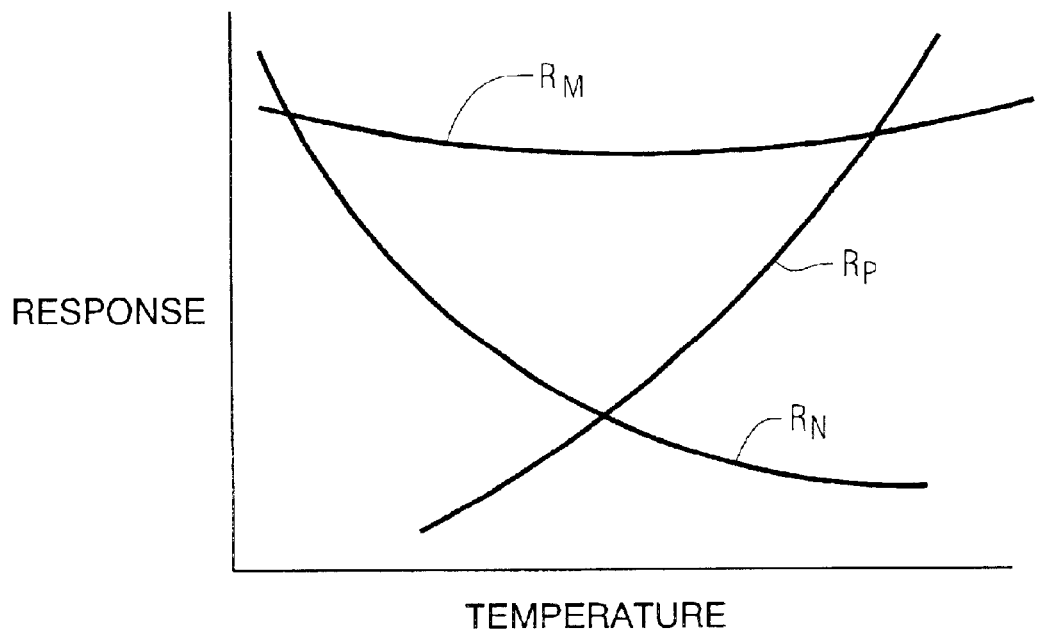
FIG. 4 is a plot of response versus temperature for the NTC thermistor/resistor network, the PTC meter component and the combined circuit of FIG. 3.

From Equations 1 and 2 and the impedance versus temperature curves of bimetal materials (e.g., as shown in FIG. 1), it will be apparent that the amplifier circuit 270 of FIG. 13 compensates for inaccuracy of indirect current measurements from the voltage drop across a bimetal element, such as bimetal 129.

Figure 14:
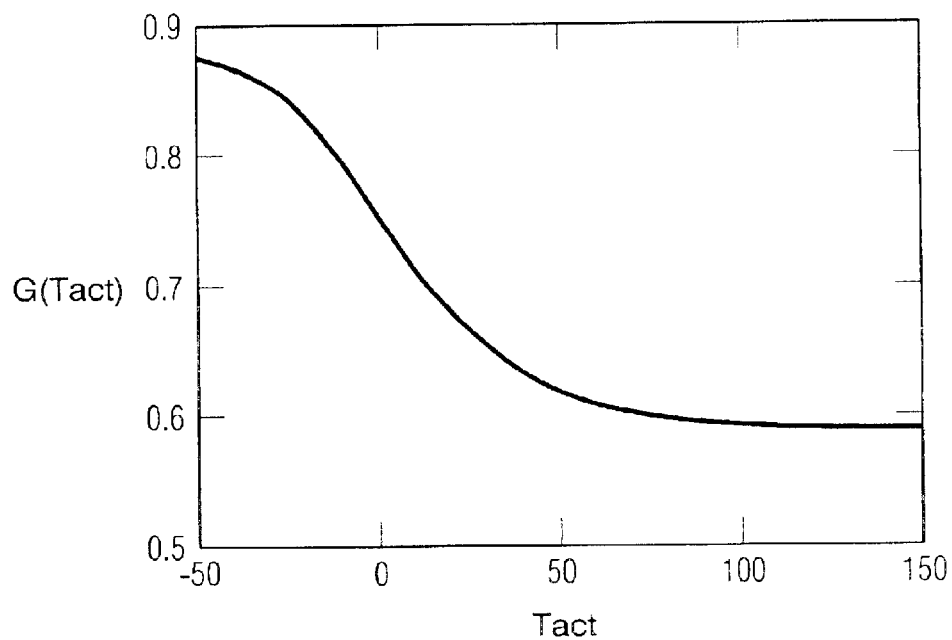
FIG. 14 is a plot of amplifier gain versus temperature (degrees Celsius) for the temperature compensated amplifier of FIG. 13.

FIG. 14 shows an exemplary gain $G(T_{act})$ versus temperature ($T_{act}$) curve for the amplifier circuit 270 of FIG. 13. While not providing an exact match to the bimetal resistivity curve (e.g., FIG. 1), the gain characteristic in FIG. 14 may be advantageously employed to minimize the inaccuracy in indirect current measurements from the voltage drop across a bimetal element, such as 129.

Figure 15:
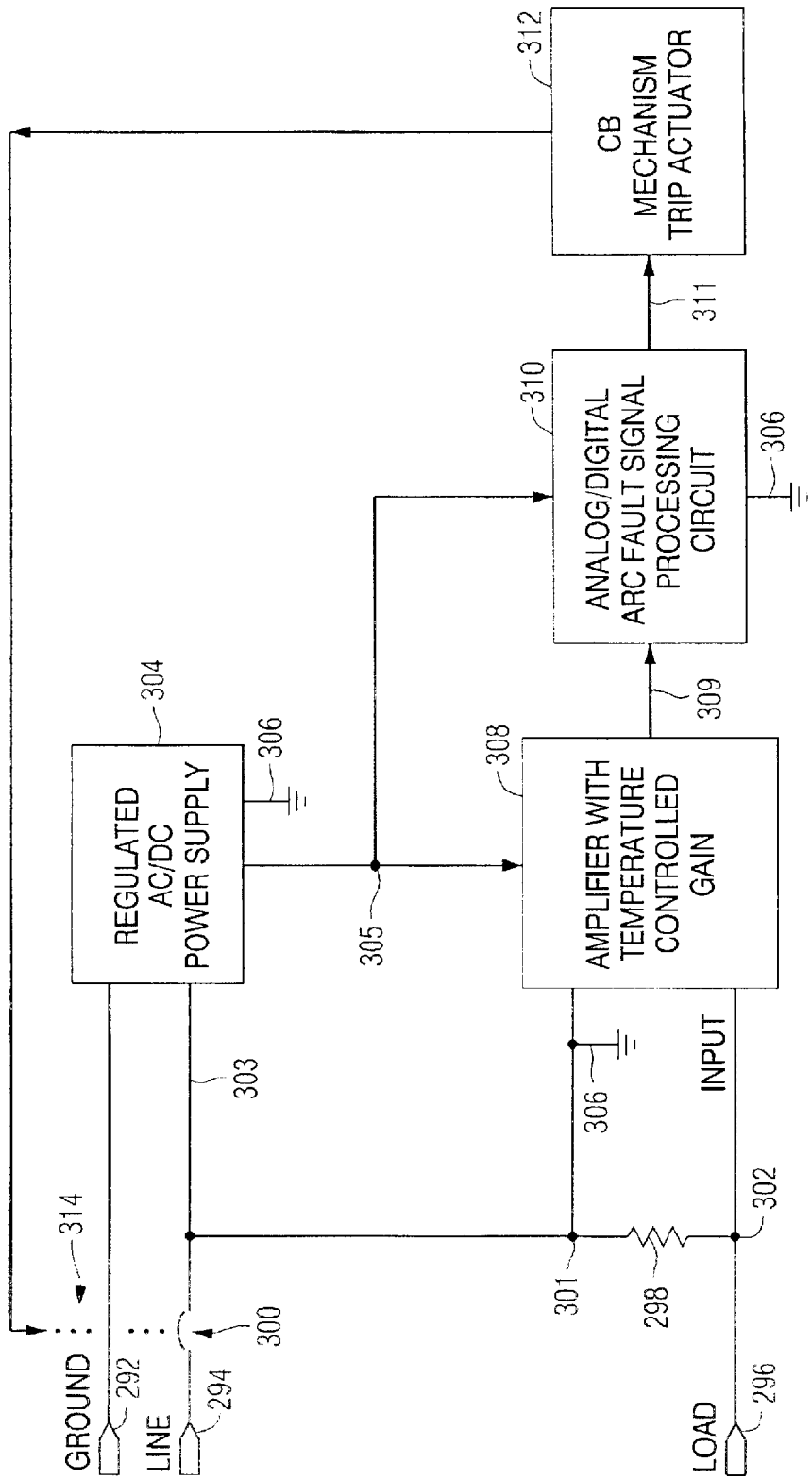
FIG. 15 is a block diagram of a circuit breaker in accordance with an embodiment of the present invention.

FIG. 15 shows a block diagram of a circuit breaker 290 in accordance with an embodiment of the invention. The circuit breaker 290 includes a system AC ground reference 292, a line terminal 294, a load terminal 296 and a bimetallic resistive element 298 in series with separable contacts 300 between the line and load terminals 294,296. The bimetallic resistive element 298 is adapted for heating by current flowing therethrough and includes a temperature, a positive temperature coefficient, a first terminal 301 and a second terminal 302. A regulated AC/DC power supply 304 employs the AC ground reference 292 and an alternating current voltage 303 from the separable contacts 300 and the line terminal 294, in order to provide a suitable DC output 305 as referenced to a local ground 306 (which is not to be confused with the AC ground reference 292). In the exemplary embodiment, the local ground 306 is electrically connected to the bimetal first terminal 301. The circuit breaker 290 further includes an amplifier with temperature controlled gain 308, such as the amplifier circuit 270 of FIG. 13.

A suitable trip circuit, such as the exemplary analog/digital arc fault signal processing circuit 310, employs a compensated voltage 309 from the temperature controlled gain amplifier 308 and provides a trip signal 311 as a function of the compensated voltage 309. Suitable arc fault detectors, which provide a trip signal from an uncompensated voltage (e.g., as appears at the exemplary second bimetal terminal (Input) 302 with respect to the first bimetal terminal 301 (local ground)), are disclosed in incorporated by reference U.S. Pat. Nos. 5,224,006; 5,691,869; and 5,818,237. In turn, a circuit breaker mechanism trip actuator 312, such as a solenoid, releases a latch member 314 to trip the separable contacts 300 open in response to the trip signal 311.

Figure 16:
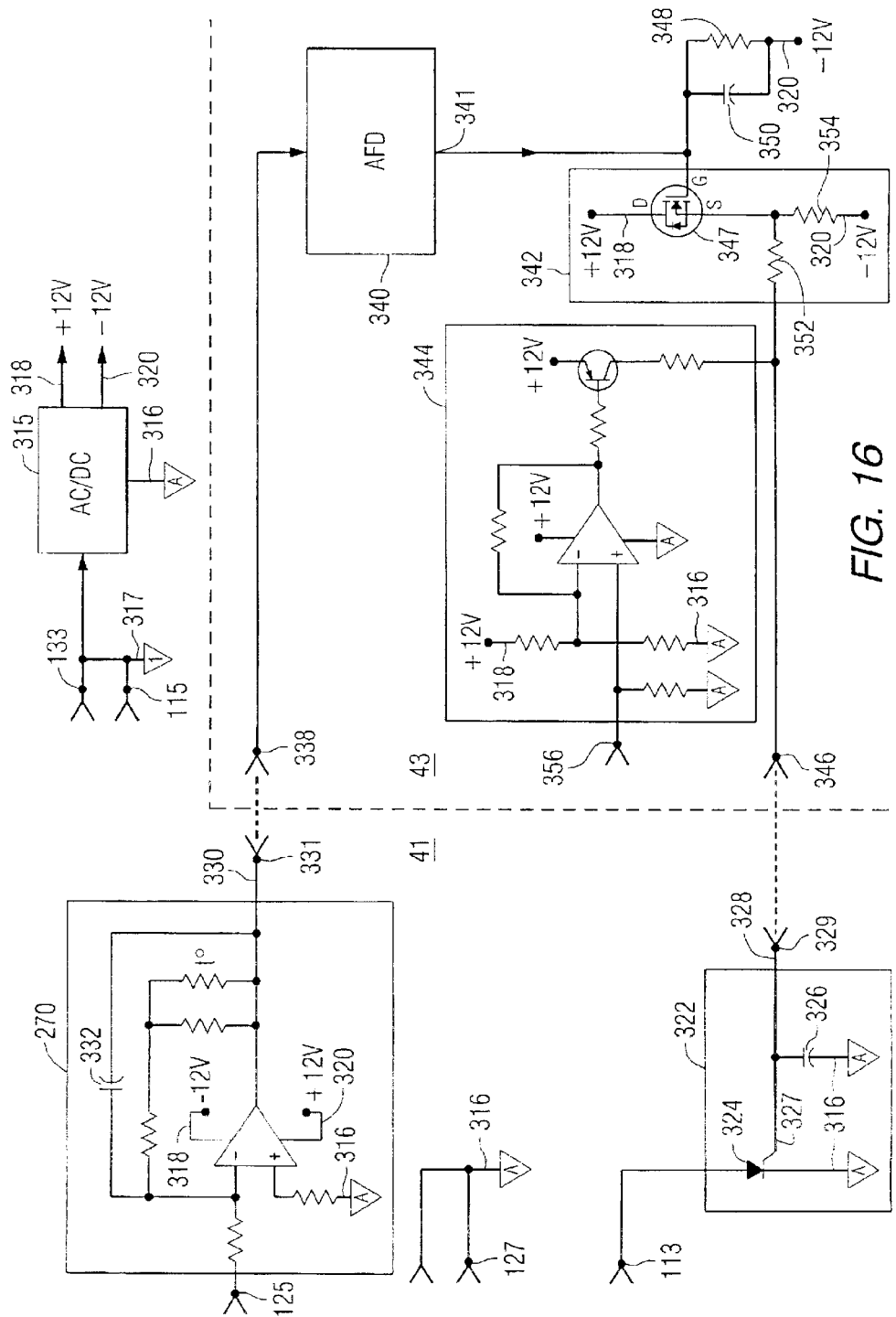
FIG. 16 is a block diagram in schematic form showing the compensation and trip circuits of the two printed circuit boards of the circuit breaker of FIG. 5.

Referring to FIG. 16, the first PCB 41 of the circuit breaker 1 of FIG. 5 includes the terminals 113,115,125,127, 133. The first PCB 41 further includes the compensation circuit 270 of FIG. 13 and a suitable AC/DC power supply 315, which is referenced to the terminal 127 (i.e., the mechanism plate terminal 123 of FIG. 10). The AC/DC power supply 315 inputs an AC voltage, which is defined by the AC voltage between the terminal 127 (i.e., local reference 316) and the terminal 115 (i.e., AC reference 317). The local reference 316, which is the line voltage on the mechanism plate 23 (FIG. 10) when the separable contacts 59 are closed with the line terminal 32 being energized, is not to be confused with the AC reference 317, which is the system ground from the terminal 131 and the bezel 29 of FIG. 7. The exemplary power supply 315 outputs a +12 VDC voltage 318 and a -12 VDC voltage 320 (with respect to the local reference 316) for use by the PCBs 41,43.

The first PCB 41 also includes a trip actuator drive circuit 322 including a silicon-controlled rectifier (SCR) 324 and a gate capacitor 326 disposed between the SCR gate 327 and the local reference 316. The SCR gate 327 is driven by a trip signal 328 on a terminal 329 from the second PCB 43. When the trip signal 328 transitions to an active state, the SCR 324 is turned on, thereby providing the AC voltage (i.e., between the terminals 113 and 115) to energize the coil assembly 117 of the trip motor 119 of FIG. 12.

The compensation circuit 270 inputs the bimetal voltage from the terminal 125, which is electrically connected to the load terminal 33, and outputs a compensated voltage 330 on a terminal 331 to the second PCB 43. The exemplary circuit 270 includes a capacitor 332, which is employed to filter high frequency noise, although it makes no contribution regarding the temperature compensation. The first terminal (i.e., the foot 165) of the bimetal 129 (FIG. 11) has a first voltage, which is the AC voltage of the mechanism plate 23 with respect to the system ground of the bezel 29, and the second terminal (i.e., the foot 164) of the bimetal 129 has a second voltage, which is the AC voltage of the load terminal 33. Those AC voltages differ (i.e.,)V=IR as a function of the resistance (R) of the bimetal 129 and the load current (I).

The energized coil assembly 117 of FIG. 12 drives an armature section 334 of the trip latch 229 to release the latch member 77. When the coil assembly 117 is energized, the trip latch armature section 334 is attracted toward the core of the trip motor 119, thereby rotating the upper portion 336 right (with respect to FIG. 12) to an unlatched position.

Referring again to FIG. 16, the second PCB 43 includes an input terminal 338 from the terminal 331 of the first PCB 41, a suitable arc fault detection (AFD) circuit 340 having an output 341, a gate drive circuit 342, a trip actuator drive circuit 344, and an output terminal 346 to the terminal 329 of the first PCB 41. The gate drive circuit 342 has a MOSFET transistor 347, the gate of which is normally biased off by the negative voltage from the resistor 348. Whenever the output 341 of the AFD circuit 340 provides a sufficient time attenuated arc fault accumulation on the capacitor 350, the gate of the transistor 347 is active and the transistor 347 provides the active trip signal 328 through the resistor 352, terminals 346,329 to the gate 327 of the SCR 324, which, in turn, energizes the coil assembly 117. Otherwise, the gate 327 is biased off by the negative voltage from the resistor 354.

Two NTC thermistors (not shown) are mounted at the circuit breaker terminals 32,33 (FIG. 8) and initiate a trip if the terminals overheat. Those thermistors are electrically connected in parallel between the +12 VDC voltage 318 and the input terminal 356 of the trip actuator drive circuit 344. As the terminal temperature rises, the thermistor resistance decreases and the voltage at terminal 356 approaches the trip threshold of the circuit 344, which ultimately trips the circuit breaker 1.

The exemplary compensation circuits 270,308 may be employed in any application of a bimetal, such as 129, which needs a suitably accurate measurement of the magnitude of the current, or other thermally sensitive sensing element, which indirectly senses current. This provides improved accuracy in the circuit breaker trip function, thereby reducing nuisance trips and improving reliability of the breaker. Although the exemplary bimetal's primary purpose is to implement thermal overcurrent protection, the exemplary compensation circuits 270,308 may be employed for other trip functions (e.g., instantaneous trip) or as a diagnostic check of the bimetal. Furthermore, the exemplary compensation circuits 270,308 may be employed in a solid state circuit breaker (not shown), which senses current across a metallic fusible link having a positive temperature coefficient and performs electronic functions such as, for example, overload, instantaneous trip, arc fault detection, and/or ground fault detection.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A circuit breaker comprising:
   separable contacts;
   a latchable operating mechanism including a latch member which when released opens said separable contacts;

a bimetal in series with said separable contacts and adapted for heating by current flowing therethrough, said bimetal including a temperature, a temperature coefficient, a first terminal, and a second terminal having a voltage, said bimetal being adapted to deflect by said heating, said bimetal coupled to said latch member to release said latch member in response to a persistent overcurrent condition; and a trip assembly comprising:
  a thermistor adapted to respond to the temperature of said bimetal,
  an amplifier having a first input, a second input and an output,
  a first resistor electrically connected between the second terminal of said bimetal and the first input of said amplifier,
  a second resistor electrically connected in parallel with said thermistor,
  a third resistor electrically connected in series with the parallel combination of said second resistor and said thermistor, with the series combination of said third resistor and the parallel combination of said second resistor and said thermistor being electrically connected between the first input of said amplifier and the output of said amplifier, the second input of said amplifier being referenced to the first terminal of said bimetal, the output of said amplifier having a voltage which is compensated for the temperature coefficient of said bimetal,
  means for providing a trip signal as a function of said compensated voltage, and
  means for releasing said latch member to trip said separable contacts open in response to said trip signal.

2. The circuit breaker of claim 1 wherein the first terminal of said bimetal has a first voltage; and wherein the voltage of the second terminal of said bimetal is a second voltage which is different from said first voltage.

3. The circuit breaker of claim 1 wherein the temperature coefficient of said bimetal is positive; and wherein said thermistor has a negative temperature coefficient.

4. The circuit breaker of claim 1 wherein said means for providing a trip signal includes means for determining an arc fault trip condition.

5. The circuit breaker of claim 1 wherein the first terminal of said bimetal has a voltage; wherein said means for providing a trip signal has a ground which is the voltage of the first terminal of said bimetal; wherein said amplifier is an operational amplifier having an inverting input as said first input and a non-inverting input as said second input; and wherein a fourth resistor is electrically connected between said non-inverting input and said ground.

6. The circuit breaker of claim 5 wherein the output of said operational amplifier provides a negative gain with respect to the voltage of said bimetal.

7. The circuit breaker of claim 1 wherein said means for releasing said latch member includes a solenoid having a coil adapted for energization in response to said trip signal and an armature driven by said coil for releasing said latch member.

8. The circuit breaker of claim 1 wherein said bimetal includes a bimetal member and a cantilevered ambient compensation bimetal, said bimetal member and said cantilevered ambient compensation bimetal cooperating to release said latch member in response to said persistent overcurrent condition compensated for ambient conditions.

9. The circuit breaker of claim 1 wherein said means for providing a trip signal includes an arc fault trip circuit.

10. A method of operating a circuit breaker having separable contacts, said method comprising the steps of:
  employing a bimetal having a temperature coefficient in series with said separable contacts;
  heating said bimetal to a temperature by passing current through the series combination of said bimetal and said separable contacts;
  employing a thermistor having a first terminal and a second terminal to respond to the temperature of said bimetal;
  employing an amplifier having a first input, a second input and an output;
  electrically connecting a first resistor between the second terminal of said bimetal and the first input of said amplifier,
  electrically connecting a second resistor in parallel with said thermistor;
  electrically connecting a third resistor in series with the parallel combination of said second resistor and said thermistor;
  electrically connecting the series combination of said third resistor and the parallel combination of said second resistor and said thermistor between the first input of said amplifier and the output of said amplifier;
  referencing the second input of said amplifier to the first terminal of said bimetal;
  outputting a voltage from the output of said amplifier;
  providing a trip signal as a function of the voltage; and
  opening the separable contacts of said circuit breaker in response to said trip signal.

11. The method of claim 10 further comprising:
  employing a positive temperature coefficient as the temperature coefficient of said bimetal; and
  employing said thermistor having a negative temperature coefficient.

12. The method of claim 10 further comprising:
  providing said trip signal as a function of arc fault conditions.

13. The method of claim 10 further comprising:
  providing a negative gain from the output of said amplifier with respect to a voltage of said bimetal.

14. A trip assembly for a circuit breaker having separable contacts and being responsive to a trip signal, said trip assembly comprising:
  a bimetal adapted for connection in series with said separable contacts and adapted for heating by current flowing therethrough, said bimetal including a temperature, a temperature coefficient, a first terminal, and a second terminal having a voltage;
  a thermistor adapted to respond to the temperature of said bimetal;
  an amplifier having a first input, a second input and an output;
  a first resistor electrically connected between the second terminal of said bimetal and the first input of said amplifier;
  a second resistor electrically connected in parallel with said thermistor;
  a third resistor electrically connected in series with the parallel combination of said second resistor and said thermistor, with the series combination of said third resistor and the parallel combination of said second resistor and said thermistor being electrically connected between the first input of said amplifier and the output of said amplifier, the second input of said amplifier being referenced to the first terminal of said bimetal, the output of said amplifier having a voltage; and means for providing said trip signal as a function of the voltage of the output of said amplifier.

15. The trip assembly of claim 14 wherein the first terminal of said bimetal has a first voltage; and wherein the voltage of the second terminal of said bimetal is a second voltage which is different from said first voltage.

16. The trip assembly of claim 14 wherein the temperature coefficient of said bimetal is positive; and wherein said thermistor has a negative temperature coefficient.

17. The trip assembly of claim 14 wherein said means for providing a trip signal includes an arc fault trip circuit.

18. The trip assembly of claim 14 wherein the first terminal of said bimetal has a voltage; wherein said means for providing a trip signal has a ground which is the voltage of the first terminal of said bimetal; wherein said amplifier is an operational amplifier having an inverting input as said first input and a non-inverting input as said second input; and wherein a fourth resistor is electrically connected between said non-inverting input and said ground.

19. The trip assembly of claim 14 wherein the output of said operational amplifier provides a negative gain with respect to the voltage of said bimetal.

20. A bimetal compensation circuit for a circuit breaker having separable contacts and a bimetal electrically connected in series with said separable contacts and adapted for heating by current flowing therethrough, said bimetal including a temperature, a temperature coefficient, a first terminal, and a second terminal having a voltage, said bimetal compensation circuit comprising:

a thermistor adapted to respond to the temperature of said bimetal;

an amplifier having an input and an output;

a first resistor electrically connected between the second terminal of said bimetal and the input of said amplifier;

a second resistor electrically connected in parallel with said thermistor; and a third resistor electrically connected in series with the parallel combination of said second resistor and said thermistor, the series combination of said third resistor and the parallel combination of said second resistor and said thermistor being electrically connected between the input of said amplifier and the output of said amplifier, the output of said amplifier having a voltage, which is compensated for the temperature coefficient of the bimetal.

* * * * *